US006835892B2

(12) United States Patent
Nassi et al.

(10) Patent No.: US 6,835,892 B2
(45) Date of Patent: Dec. 28, 2004

(54) SUPERCONDUCTING CABLE

(75) Inventors: Marco Nassi, Turin (IT); Pierluigi Ladie', Milan (IT)

(73) Assignee: Pirelli Cavi e Sistemi S.p.A, Milan (IT)

( * ) Notice: Subject to any disclaimer, the term of this patent is extended or adjusted under 35 U.S.C. 154(b) by 0 days.

(21) Appl. No.: 10/365,495

(22) Filed: Feb. 13, 2003

(65) Prior Publication Data

US 2003/0164246 A1 Sep. 4, 2003

Related U.S. Application Data

(62) Division of application No. 09/886,036, filed on Jun. 22, 2001, now Pat. No. 6,633,003, which is a continuation of application No. PCT/EP99/10446, filed on Dec. 22, 1999.

(30) Foreign Application Priority Data

Dec. 24, 1998 (EP) .............................................. 98204403

(51) Int. Cl.[7] .............................................. H01B 12/00
(52) U.S. Cl. ...................... 174/125.1; 29/599; 505/231; 505/431; 505/884
(58) Field of Search .............................. 174/15.4, 15.5, 174/125.1; 505/230–232, 430–433, 884–887; 29/599

(56) References Cited

U.S. PATENT DOCUMENTS

| 3,984,618 | A | * | 10/1976 | Schmidt ..................... 174/15.5 |
| 4,031,310 | A | | 6/1977 | Jachimowicz |
| 5,068,219 | A | * | 11/1991 | Hagino et al. .............. 505/231 |
| 5,276,281 | A | * | 1/1994 | Sato et al. ................... 505/230 |
| 5,929,385 | A | | 7/1999 | Sugimoto et al. |
| 5,932,523 | A | * | 8/1999 | Fujikami et al. ............ 505/231 |
| 6,153,825 | A | | 11/2000 | Ando et al. |
| 6,255,595 | B1 | | 7/2001 | Metra et al. |
| 6,313,408 | B1 | | 11/2001 | Fujikami et al. |
| 6,633,003 | B2 | * | 10/2003 | Nassi et al. ............... 174/125.1 |

FOREIGN PATENT DOCUMENTS

| EP | 0 786 783 A | 7/1997 |
| FR | 2 122 741 A | 9/1972 |

OTHER PUBLICATIONS

Application No. 09/498,062 filed Feb. 4, 2000 (corresponds to PCT/EP98/04991).

(List continued on next page.)

Primary Examiner—David Zarneke
Assistant Examiner—Jeremy Norris
(74) Attorney, Agent, or Firm—Finnegan, Henderson, Farabow, Garrett & Dunner, L.L.P.

(57) ABSTRACT

Superconducting cable (1) comprising:
  a) a layer (20) of tapes comprising superconducting material,
  b) a tubular element (6) for supporting said layer (20) of tapes comprising superconducting material,
  c) a cooling circuit, adapted to cool the superconducting material to a working temperature not higher than its critical temperature,
characterized in that said tubular element (6) is composite and comprises a predetermined amount of a first material having a first thermal expansion coefficient and a second material having a thermal expansion coefficient higher than that of said first material, said thermal expansion coefficients and said amounts of said first and second material being predetermined in such a way that said tubular element has an overall thermal shrinkage between the room temperature and said working temperature of the cable such as to cause a deformation of said tapes comprising superconducting material lower than the critical deformation of the same tapes.

14 Claims, 4 Drawing Sheets

OTHER PUBLICATIONS

Application No. 09/885,940 filed June 22, 2001 (corresponds to PCT/EP99/10443).

Okaniwa, IEEE Transactions on Power Delivery, vol. 7, nr.4, Oct. 1992, pp. 1745–1753.

Efunda, "Properties of Common Solid Materials" pp. 1–3, at http://www.efunda.com/materials/common_matl/common_matl.cfm.

Vishay Measurements Group "Strain Gage Technology: Temperature Effects Thermal Expansion Coefficients of Engineering Materials", pp. 1–3 (1992), at http://new.vishay.com/brands/measurements_group/guide/tn/tn504/504t1.htm.

PCT International Search Report Appln. No. PCT/EP99/10446, Dec. 24, 1998.

U.S. patent application Ser. No. 09/498,062, filed Feb. 4, 2000.

U.S. patent application Ser. No. 09/885,940, filed Jun. 22, 2001.

* cited by examiner

SUPERCONDUCTING CABLE

This is a division of application Ser. No. 09/886,036, file Jun. 22, 2001, now U.S. Pat. No. 6,633,003 which is a continuation of International Application No. PCT/EP99/10446, filed Dec. 22, 1999.

FIELD OF INVENTION

In a general aspect thereof, the present invention relates to a cable to be used to transmit electric current in conditions of so-called superconductivity, i.e. in conditions of almost null electric resistance.

More particularly, the invention relates to a superconducting cable comprising:

a) a layer of tapes comprising superconducting material, b) a tubular element for supporting said layer of tapes comprising superconducting material c) a cooling circuit adapted to cool the superconducting material to a working temperature non higher than its critical temperature.

In the following description and the subsequent claims, the term: superconducting material, indicates a material, such as for instance special niobium-titanium alloys or ceramics based on mixed oxides of copper, barium and yttrium, or of bismuth, lead, strontium, calcium, copper, thallium and mercury, comprising a superconducting phase having a substantially null resistivity under a given temperature, defined as critical temperature (in the following also shortly referred to as Tc).

The term: cable for high power, indicates a cable to be used for transmitting current quantities generally exceeding 3,000 A, such that the induced magnetic field starts to reduce the value of the maximum current density achievable in superconductivity conditions.

The term: superconductor cable indicates in the following any element capable of transmitting electric current in superconductivity conditions, such as for example tapes of superconducting material wound onto a supporting core.

The superconducting cables comprise a structural element consisting of the supporting tubular element of the superconducting material.

Patent application EP 97202433.5 in the name of the Applicant discloses a supporting tubular element entirely consisting of a tube made of polymeric material, typically polytetrafluoroethylene or polyamide.

The same patent application EP 97202433.5 also discloses a supporting tubular element made of metallic material such as steel, copper or aluminum.

The superconducting cable is installed at room temperature, as well as the electrical (to the terminals) and hydraulic connections (attached to the cooling circuits of the cable).

After the installation the cable is brought to its working temperature by means of the cooling liquid. During such cooling each component of the cable is submitted to mechanical stresses of thermal nature, according to the thermal coefficients of the constituting materials.

In particular mechanical stresses are generated in the layers of superconducting materials and at the terminals connected to the ends of the cable.

The Applicant has noticed that the supporting element must not only offer a satisfactory mechanical support to the layer or layers of superconducting material, but also at the same time perform a number of additional functions not less important for the good operation of the cable.

More particularly, the supporting element should:

i) ensure that during cooling of the cable no internal stresses are generated within the superconducting material nor at the ends of the cable;

ii) ensure the mechanical stability of the cable, that is to say, the cable can be bent according to bending radiuses compatible with the diameters of the reels onto which the cable is wound for its transport;

iii) contribute to the mechanical resistance of the cable during the installation; and iv) substantially contribute to the cryostabiliity of the cable in case of short circuit, this term indicating both keeping the superconducting material below its critical temperature and keeping the cooling fluid in liquid state.

The Applicant has found that the use of a substantially composite supporting tubular element allows to reduce the stresses imparted to the superconducting material both in radial direction and along a longitudinal direction, while ensuring at the same time a sufficient amount of metallic material for ensuring the cryostability of the cable.

According to a first aspect the invention relates to a superconducting cable of the above indicated type, which is characterized in that said tubular element is composite and comprises a predetermined amount of a first material having a first thermal expansion coefficient and a second material having a thermal expansion coefficient higher than that of said first material, said thermal expansion coefficients and said amounts of said first and second material being predetermined in such a way that said tubular element has an overall thermal shrinkage between the room temperature and said working temperature of the cable such as to cause a deformation of said tapes comprising superconducting material lower than the critical deformation of the same tapes.

In a second aspect thereof, the invention relates to a superconducting element characterized in that said tubular element is substantially composite and comprises a electrical contact with the layer of superconducting material and at least one second polymeric material associated to said first material.

According to a third aspect of the invention, a method for limiting the tensile stresses along a longitudinal direction imparted to opposite fixing terminals of a superconducting cable of the type with clamped heads as a consequence of cooling is provided, the cable comprising at least one layer of superconducting material, which is characterized by providing in the cable a composite tubular element for supporting the layer of superconducting material.

In the following description and in the subsequent claims, the term: superconducting cable of the type with clamped heads, indicates a cable whose opposite ends are mechanically constrained to respective fixing terminals in such a way that no substantial relative sliding in axial direction between tapes and supports and with respect to the terminal themselves takes place.

Advantageously, the aforesaid composite supporting tubular element is able not only to adequately support the superconducting material, but also to limit the stresses induced along a longitudinal direction in the layer of superconducting material and in the terminals connected to the ends of the cable and to provide at the same time an amount of metal in electrical connection with the superconducting material, capable to substantially contribute to the cryostability of the cable during the short circuit transient.

In particular, it has been found that such composite supporting tubular element, thanks to the presence of the above indicated second material having a higher thermal expansion coefficient, has an overall thermal expansion coefficient equal to or higher than that of the superconducting material, and therefore during the cooling step of the cable is able to shrink in radial direction to a greater extent with respect to entirely metallic supports, or, anyway, to an extent such as not to cause unacceptable deformations in the tapes.

In this way, the composite support according to the invention allows a greater shrinkage thereof along a longitudinal direction and, hence, allows to reduce the stresses along a longitudinal direction within the superconducting material due to the so-called constrained shrinking by the clamped heads.

Additionally, the use of a composite supporting tubular element advantageously allows to reduce in a substantial way also the stresses exerted along a longitudinal direction by the ends of the superconducting cable on the terminals with respect to the tubular elements entirely made of metal whenever the second material of the composite supporting tubular element also has a Young's modulus (E) lower than that of the first metallic material.

The longitudinal stresses to which the supporting element of the cable is submitted in operation, in fact, are proportional to the product of the thermal expansion coefficient and the respective Young's modulus (E) of the material which constitutes the supporting tubular element.

In contrast to the tubular element entirely made of polymeric material, furthermore, the composite tubular element of the invention allows to have in any case an amount of normal conductor in electrical connection with the superconducting material, which is sufficient for ensuring the cryostability of the cable during the short circuit transient.

For the purposes of the invention, the first metallic material of the composite supporting element is a metal preferably having a resistivity at 77 K<5*10−9 Ωm, a specific heat at 77 K>106 J/m3K and a heat conductivity at 77 K>5 W/mK.

In particular, the first metallic material of the composite supporting element is selected from the group comprising: copper, aluminum and alloys thereof.

Preferably, the aforesaid second material is a non metallic material and has a thermal expansion coefficient higher than 17*10−6° C.−1, preferably higher than 20*10−6° C.−1, and still more preferably comprised between 40 and 60*10−6° C.−1.

In a preferred embodiment, the aforesaid second non metallic material is a plastics material.

For the purposes of the invention, the plastics material is preferably selected from the group comprising: polyamide, such as for example nylon, polytetrafluoroethylene (PTFE), polyethylene.

The values of the percent thermal shrinkage (F) between the room temperature and 77K and of the Young's modulus (E) at 77K of some materials provided for use when manufacturing the composite supporting element according to the invention, are indicated in the following table.

| Material | ε (%) | E (GPa) |
|---|---|---|
| Cu | 0.30 | 100 |
| Al | 0.39 | 77 |
| Ag | 0.36 | 100 |
| PTFE | 2.00 | 5 |

In an advantageous embodiment, the aforesaid first and second materials are formed as adjacent annular sectors. Such design allows, in particular, to facilitate the step or manufacturing the composite tubular element.

For the purposes of the invention, the number of sectors of said first and second material and the arrangement of such sectors may be easily determined by a man skilled in the art on the basis of the construction requirements of the cable. For example, if a particularly high thermal shrinkage is required, the metallic portion may be reduced, for example down to 10% or less, while if greater stiffness or specific electrical characteristics are required, the polymeric portion may be consequently reduced.

Preferably, the number of sectors for manufacturing a composite supporting tubular element is comprised between 3 and 50. In a preferred embodiment, such number is chosen as a function of the outer diameter of the composite supporting tubular element and of the thickness of the sectors in such a way that the ratio "K" between the thickness "s" of the sector and its width "l" is comprised between 0,4 and 0,7.

Preferably, the sectors of said first and second material are alternately arranged one after the other. Such arrangement allows in fact to make a supporting tubular element having mechanical characteristics as homogeneous as possible which allow to ensure both a satisfactory dynamic stability of the stranding machine used for manufacturing the supporting tubular element, and the mechanical congruence of the composite supporting tubular element as a whole during the cooling of the cable.

Preferably, the annular sectors of said first and second material are spirally wound with a winding-angle comprised between 5° and 50°. In such a way, it is possible to ensure a satisfactory and lasting clamping between adjacent sectors.

According to a further embodiment, the composite supporting tubular element of the superconducting material may comprise an inner tubular element essentially consisting of said second material onto which thin foils or wires essentially consisting of said first metallic material are wound.

Preferably the phase conductor comprises at least one superconducting tape wherein said layer or superconducting material is incorporated within a metallic coating.

Advantageously, the cable of the invention comprises a plurality of superconducting tapes spirally wound on the surface of the supporting tubular element according to a winding angle comprised between 5° and 60°, and preferably between 10° and 40°. In such a way, it is advantageously possible to further reduce possible mechanical stresses generated inside each of the aforesaid tapes.

According to an alternative embodiment, the phase conductor comprises at least one reinforcing foil of metallic material coupled, preferably in a substantially irreversible way, to the metallic coating of the superconducting tape and in electrical connection with the superconducting material.

In this way, during the short circuit transient, the overcurrent is split up between the metallic material of the tape, the metallic material of the supporting tubular element and the reinforcing foil, electrically connected in parallel to the superconducting material and constituting a resistive type conductor, by-passing the latter. At the end of the short circuit transient, the current may be transported again by the superconducting material in superconductivity conditions.

In particular, in the conductive element the electrical connection of the metallic material of the tape with the one hand, and with the reinforcing foil on the other hand, is made either placing the aforesaid materials in direct contact with one another or interposing between them conductive elements known per se.

Preferably, the reinforcing foil has a thickness not higher than half of the thickness of the metallic coating and advantageously contributes to increase the resistance of the conductive element of the cable at the various mechanical or thermal stresses, imparted thereto during installation or use.

Still more preferably, such thickness is comprised between 0.03 and 0.08 mm.

In a preferred embodiment of the invention, the resistance of the conductive element of the cable to the various stresses imparted thereto may be advantageously further increased submitting the superconducting material to a predetermined prestress degree along a longitudinal direction.

Such a prestress is preferably obtained by coupling the reinforcing foil to the coating material of the tape of superconducting material, while simultaneously applying to the foil a tensile stress substantially oriented along a longitudinal direction.

Advantageously, it has been found that such a prestress of the superconducting material is able to partially compensate the tensile effect applied on the superconducting material in the clamped heads arrangement of the cable when the latter is cooled from room temperature to the temperature of the cooling fluid.

Preferably a conductive element provided with reinforced tapes of the above mentioned type is obtained by applying a tensile stress comprised between $3.4*10^7$ Pa (3.5 kg/mm$^2$) and $34.3*10^7$ Pa (35 kg/mm$^2$) to the reinforcing foil by means of apparatuses known per se, such as for example by means of two coils, one for winding and the other for unwinding, of which one is suitably braked.

Due to such tensile stress, the superconducting material of the reinforced tapes so obtained has a % prestress degree along a longitudinal direction or "γ", defined as follows:

$$\gamma=[(Li-Lf)/Li]* 100$$

wherein:

Li=initial length of the tape;

Lf=final length of the tape after prestress;

comprised between 0.05 and 0.2%.

Preferably, the phase conductor comprises two reinforcing foils made of metallic material coupled to opposite faces of the metallic coating.

Preferably, the reinforcing foil and the metallic coating are reciprocally coupled in a substantially irreversible way by means of welding or brazing and in such a way as to ensure that the desired prestress of the superconducting material be maintained once the coupling is made. Advantageously, the desired electrical contact between the reinforcing foil and the metallic coating of the superconducting material is automatically ensured in case of coupling by means of welding or brazing.

Preferably, the reinforcing foil or foils and the metallic coating of said at least one superconducting tape consist of a metal selected from the group comprising: copper, aluminum, silver, magnesium, nickel, bronze, stainless steel, beryllium and alloys thereof.

Still more preferably, the reinforcing foil or foils coupled to the metallic coating of the superconducting tape or tapes consist of a metal selected from the group comprising: stainless steel, preferably magnetic, bronze, beryllium, aluminum, and alloys thereof, whereas one metallic coating consists of a metal selected from the group comprising: silver, magnesium, aluminum, nickel, and alloys thereof.

The superconducting cable of the invention may be both a coaxial and a non-coaxial cable.

In the following description and in the subsequent claims, the term: coaxial cable, indicates a cable comprising a supporting tubular element, a phase conductor coaxially surrounding the supporting tubular element, a layer of dielectric material external to the phase conductor and a return conductor supported by the layer of dielectric material and coaxial to the phase conductor.

For the purposes of the invention, inside the return conductor a current flows which is equal and opposite to that circulating inside the phase conductor, so as to generate a magnetic field equal and opposite to that generated by the current circulating in the phase conductor, so as to confine the magnetic field in the portion of the cable comprised between the two conductors and reduce the presence of dissipative currents in the cable portions externally supported with respect to the return conductor.

Preferably, the return conductor comprises at least one superconducting tape including a layer of superconducting material incorporated within a metallic coating and a predetermined amount of metallic material (stabilizing metal) in electrical contact with the metallic coating and having the function of allowing the stabilization of the superconducting material in short circuit conditions.

Preferably, besides, the overall amount of the stabilizing metal is determined by applying the same criterion of foil and adiabatic stability which is applied for the phase conductor and which will be reported in the following description.

Preferably, the stabilizing metal is split up in a plurality of straps or tapes, having a thickness comprised between 0.1 and 5 mm, in direct contact with the metallic coating of the superconducting tape, for example wound thereon.

In an alternative embodiment, the return conductor may comprise at least one metallic reinforcing foil coupled, preferably in a substantially irreversible way, to the metallic coating of the superconducting material and interposed between the latter and the stabilizing metal.

Similarly to what happens to the phase conductor, if the return conductor looses its superconducting capacities during the short circuit transient and the current passes through the stabilizing metallic material, the reinforcing foil (if present) and the metallic coating of the tapes (if present), to flow back in the superconducting material at the end of the short circuit.

Conveniently, the stabilizing metal of the return conductor, externally placed with respect to the superconducting tapes, may be split up in straps or wires, for example of copper or other suitable metal, associated to the superconducting tapes and, as such, also being spirally wound as the same tapes.

Preferably, the superconducting cable of the invention is cooled by means of a suitable pressurized and undercooled cooling fluid, in such a way as to ensure the heat exchange necessary for the operation of the cable and ensure that a temperature suitably lower than the critical temperature of the superconducting material is maintained, also for high lengths of the cable.

During its flowpath, in fact the cooling fluid is simultaneously submitted both to an increasing heating, as a result of the heat absorbed by the elements which constitute the cable, and to an increasing loss of pressure, due to the hydraulic losses while passing through the cable and to the more or less turbulent flow of the cooling fluid itself.

The choice or the working conditions of the cable is therefore made taking such phenomena into account. In particular, working conditions are preferred which maintain the cooling fluid far away from the temperature and pressure values of its own curve of saturation. Such working conditions are comprised inside the so called "working window" which delimits a portion in the state diagram of the cooling fluid inside which safety conditions exist with respect to the need of cooling the superconducting material below its critical temperature while maintaining the cooling fluid in liquid state.

Advantageously, the use of pressurized and undercooled cooling fluid allows, furthermore, to reduce the amount of metallic material employed as stabilizing metal.

Preferably, the superconducting material is of the so called "high temperature" type (Tc of about 110K) and is cooled to a temperature comprised between about 63K and 90K.

Such cooling is preferably achieved using liquid nitrogen as cooling fluid at a working pressure comprised between 10 and 20 bar.

According to the invention, the embodiments of the previously described superconducting cable may be various. In particular and as illustrated above, the cable of the invention may be coaxial or non-coaxial, the phase or the three existing phases may be monoelement or multielement, the electrical insulation may be both in cryogenic environment (cold dielectric) or at room temperature (warm dielectric), the thermal insulation may be made on each singles phase or on three joined phases.

BRIEF DESCRIPTION OF THE DRAWINGS

Further characteristics and advantages of the present invention will appear more clearly from the following detailed description of some preferred embodiments, made hereinbelow, by way of non-limitative indication, with reference to the attached drawings. In the drawings.

DETAILED DESCRIPTION OF PREFERRED EMBODIMENTS

Figure 1:
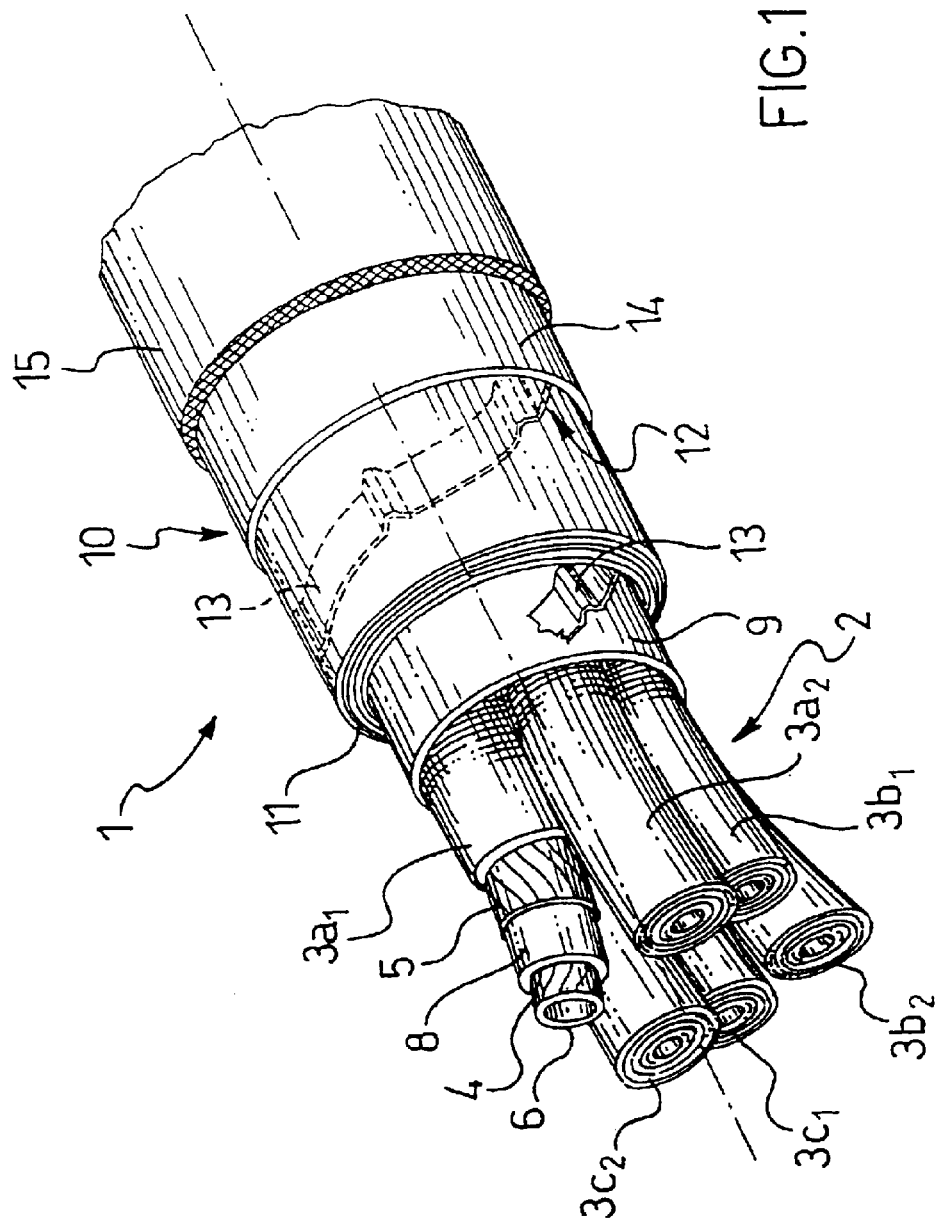
FIG. 1 shows a perspective view in partial cross-section section, of a coaxial multielement triphase superconducting cable according to a first embodiment of the present invention.

With reference to FIG. 1, a coaxial triphase superconducting cable 1 according to the present invention comprises a superconducting core, globally indicated by 2, comprising a plurality of conductive elements 3, indicated by 3a, 3b, 3c for each phase, housed—preferably loosely—within a tubular containing shell 9, made e.g. of metal such as steel, aluminum, and the like.

Each of the conductive elements 3 comprises in turn a couple of coaxial conductors, respectively phase conductors 4 and return conductors 5, each including at least one layer of superconducting material, as will appear more clearly in the following.

The coaxial phase conductors 4 and neutral conductors 5 are electrically insulated from one another by interposing a layer 8 of dielectric material, onto which the return conductor 5 is directly supported.

The cable 1 also comprises suitable means for circulating a cooling fluid adapted to cool the superconducting core 2 to a temperature adequately lower than the critical temperature of the chosen superconducting material, which in the cable of FIG. 1 is of the so-called high-temperature type.

The aforementioned means comprises suitable pumping means, known per se and therefore not shown, supplying a suitable cooling fluid, for instance liquid nitrogen at a temperature typically of from 65 to 90 K, both within each of the conductive elements 3 and within the interstices between such elements and the tubular shell 9.

In order to reduce as much as possible the thermal dissipations towards the external environment, the superconducting core 2 is enclosed in a containing structure or cryostat 10, comprising a thermal insulation, formed for instance by a plurality of superimposed layers, and at least one protection sheath.

A cryostat known in the art is described, for instance, in an article of IEEE TRANSACTIONS ON POWER DELIVERY, Vol. 7, nr. 4, Oct. 1992, pp. 1745–1753.

More particularly, in the example shown, the cryostat 10 comprises a layer 11 of insulating material, formed, for instance, by several surface-metallized tapes (for instance some tens) made of a polyester resin, known in art as "thermal superinsulator", loosely wound, with the possible help of interposed spacers 13.

Such tapes are housed in an annular hollow space 12, delimited by a tubular element 14, in which a vacuum in the order of $10-2$ $N/m2$ is maintained by means of known apparatuses.

The supporting tubular element 14 made of metal is capable of providing the annular hollow space 12 with the desired fluid-tight characteristics, and is covered by an external sheath 15, for instance made of polyethylene.

Preferably, the supporting tubular metal element 14 is formed by a tape bent in tubular form and longitudinally welded, made of steel, copper, aluminum or the like, or by an extruded tube or the like.

If the flexibility requirements of the cable so suggest, element 14 may be corrugated.

In addition to the described elements, cable traction elements may also be present, axially or peripherally located according to the construction and use requirements of the same, to ensure the limitation of the mechanical stresses applied to the superconducting elements 3; such traction elements, not shown, may be formed, according to techniques well known in the art, by peripherally arranged metal reinforcements, for instance by roped steel wires, or by one or more axial metal ropes, or by reinforcements made of dielectric material, for instance aramidic fibers.

Several superconducting elements are present for each phase, in particular, as shown by way of example in FIG. 1, each phase (a, b, c) comprises two superconducting elements, respectively indicated by the subscripts 1, 2 for each of the three illustrated superconducting elements 3a, 3b, 3c, so that the current of each phase is split up among several conductors (two in the example shown).

Figure 2:
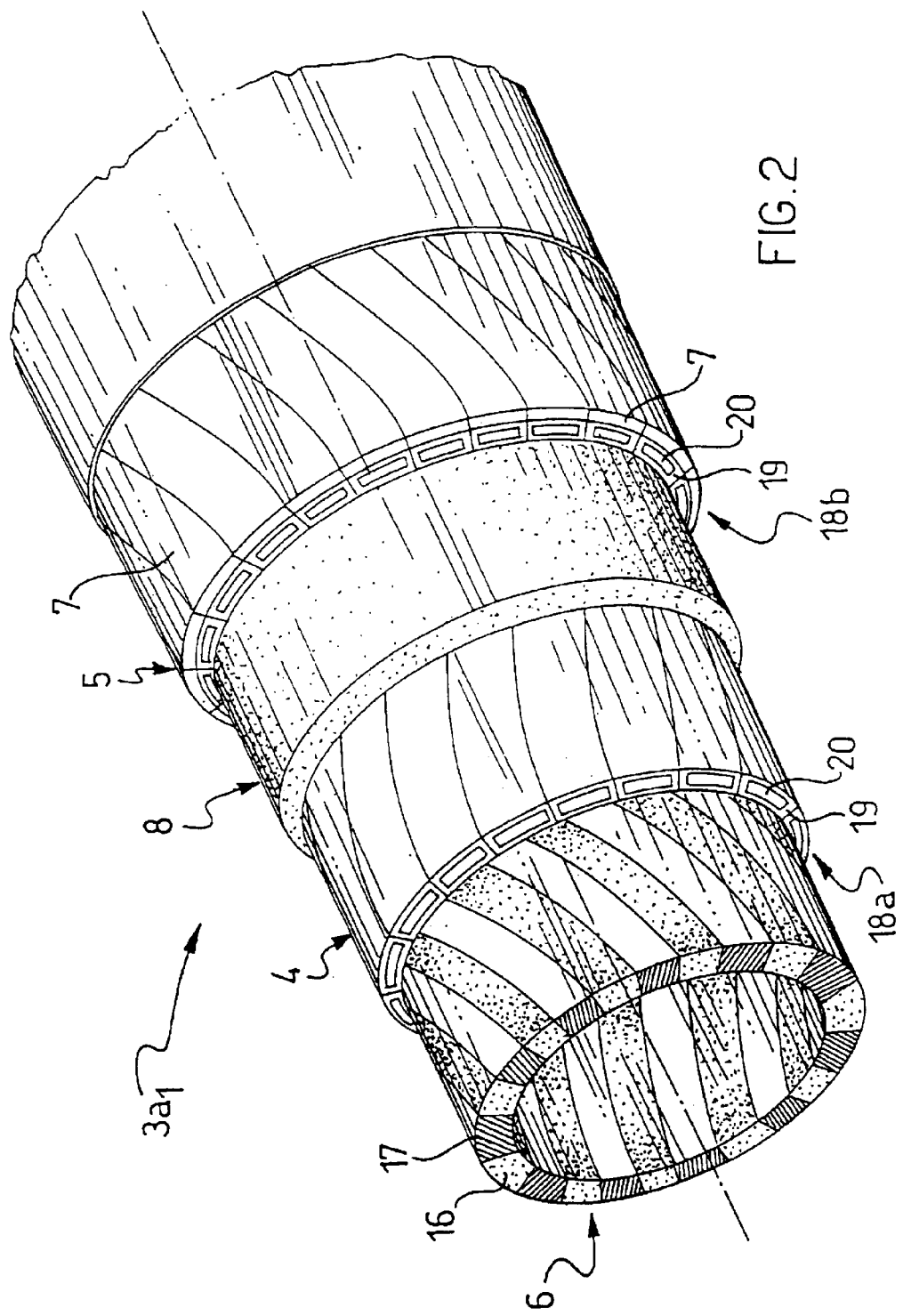
FIG. 2 shows a perspective view in an enlarged scale and in partial cross-section, of an element of the coaxial cable of preceding FIG. 1.

In FIG. 2 one of the conductive elements 3 of the coaxial superconducting cable 1 of the preceding FIG. 1 is shown in perspective and enlarged scale.

To make the description easier, in the present FIG. 2 and the following FIGS. 3 and 4, the elements of the cable structurally or functionally equivalent to those previously described with reference to FIG. 1 will be indicated by the same reference numbers and will be no longer discussed.

The conductor element 3a1, shown in FIG. 2, comprises a composite tubular element 6 including a plurality or annular sectors 16, 17 respectively made of polymeric material, for example polytetrafluoroethylene, and of metallic material, for example copper, alternately arranged one after the other and spirally wound.

Each of the coaxial phase conductors 4 and return conductor 5 comprises a plurality of superconducting tapes 18a and 18b, respectively, spirally wound on the composite tubular element 6 and onto the layer 8 of dielectric material, respectively. Each of such superconducting tapes 18a, 18b comprises a layer of superconducting material 20 enclosed within a metallic coating 19.

The return conductor 5 further comprises a plurality of copper straps 7 acting as stabilizing metal, in electrical contact with the metallic coating 19 of the superconducting tapes 18b onto which they are wound in a way known per se.

Figure 3:
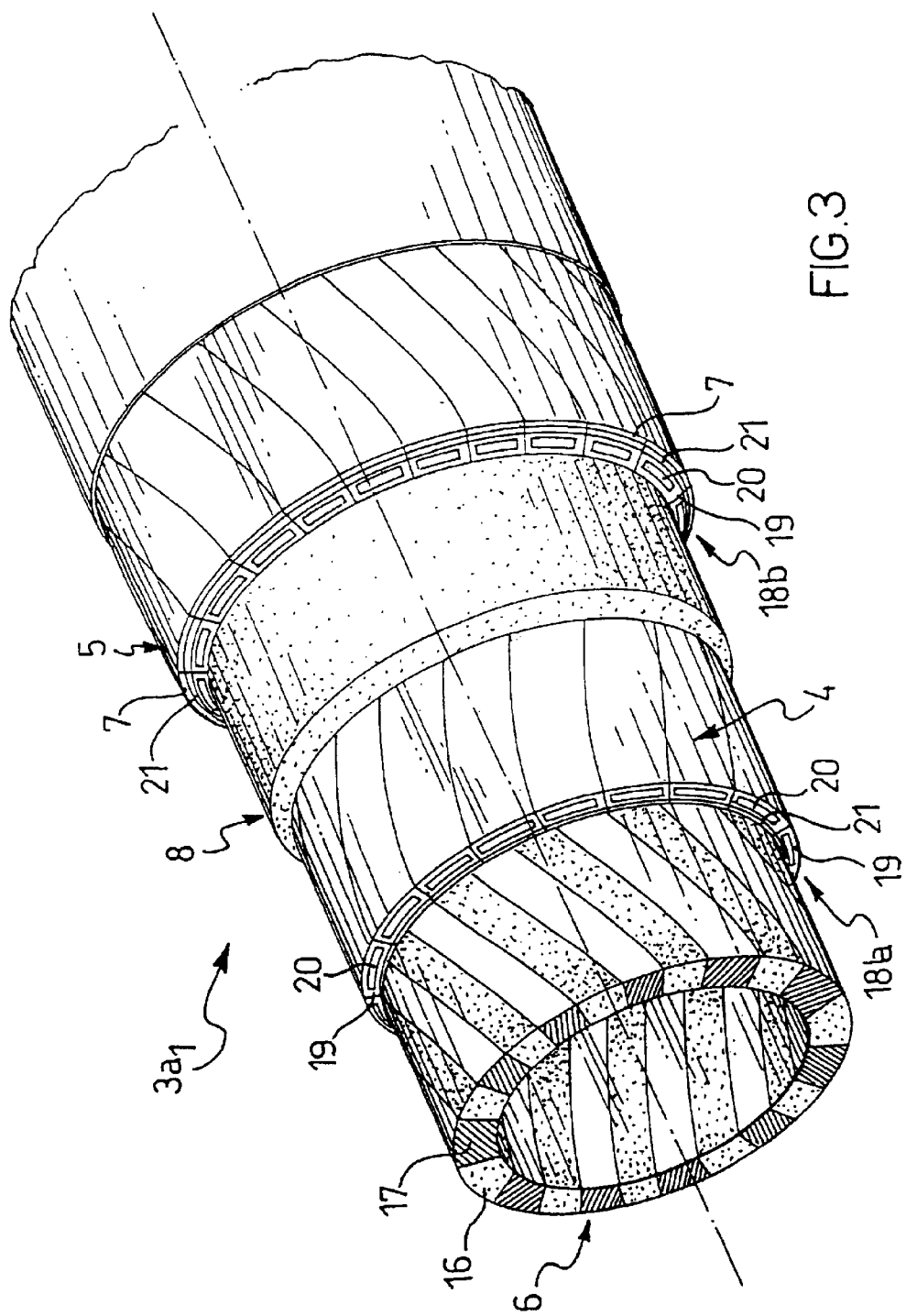
FIG. 3 shows a perspective view in an enlarged scale and in partial cross-section, of a second embodiment of an element of the coaxial cable of preceding FIG. 1, wherein both the phase conductor and the return conductor are provided with a reinforcing foil.

In the further embodiment of the conductive elements 3 of the cable 1 shown in FIG. 3, the coaxial phase conductor 4 and return conductor 5 further include a plurality of metallic reinforcing foils 21 coupled in a substantially irreversible way, for example by means of brazing, to the metallic coating 19 of the superconducting tapes 18a, 18b.

Preferably, the reinforcing foils 21 of the phase conductor 4 are coupled to a radially inner face of the metallic coating 19, so as to be interposed between the composite tubular element 6 and the tapes 18a and act in this way as elements of mechanical protection for the latter.

In such way, the foils 21 are in electrical contact both with the metallic coating 19 of the superconducting tapes 18a and with the annular sectors 17 of metallic material of the composite tubular element 6.

Preferably, the reinforcing foils 21 of the return conductor 5 are arranged in a mirror-like fashion with respect to those of the phase conductor 4, that is, they are coupled to a radially outer face of the metallic coating 19 of the tapes 18b, so as to be interposed between the copper straps 7 and the tapes and act in this way as elements of mechanical protection for the latter.

In this way, the foils 21 of the return superconductor 5 are in electrical contact both with the metallic coating 19 of the superconducting tapes 18b and with the stabilizing metal (copper straps 7).

Advantageously, furthermore, the reinforcing foils 21 of the coaxial phase conductor 4 and return conductor 5 contribute both to ensure the cryostability of cable 1 in case of short circuit and to adequately reduce the tensile stresses applied to the terminals of cable 1 when the foils are coupled to the superconducting tapes 18a, 18b in such a way as to impart to the superconducting material a predetermined prestress degree.

Figure 4:
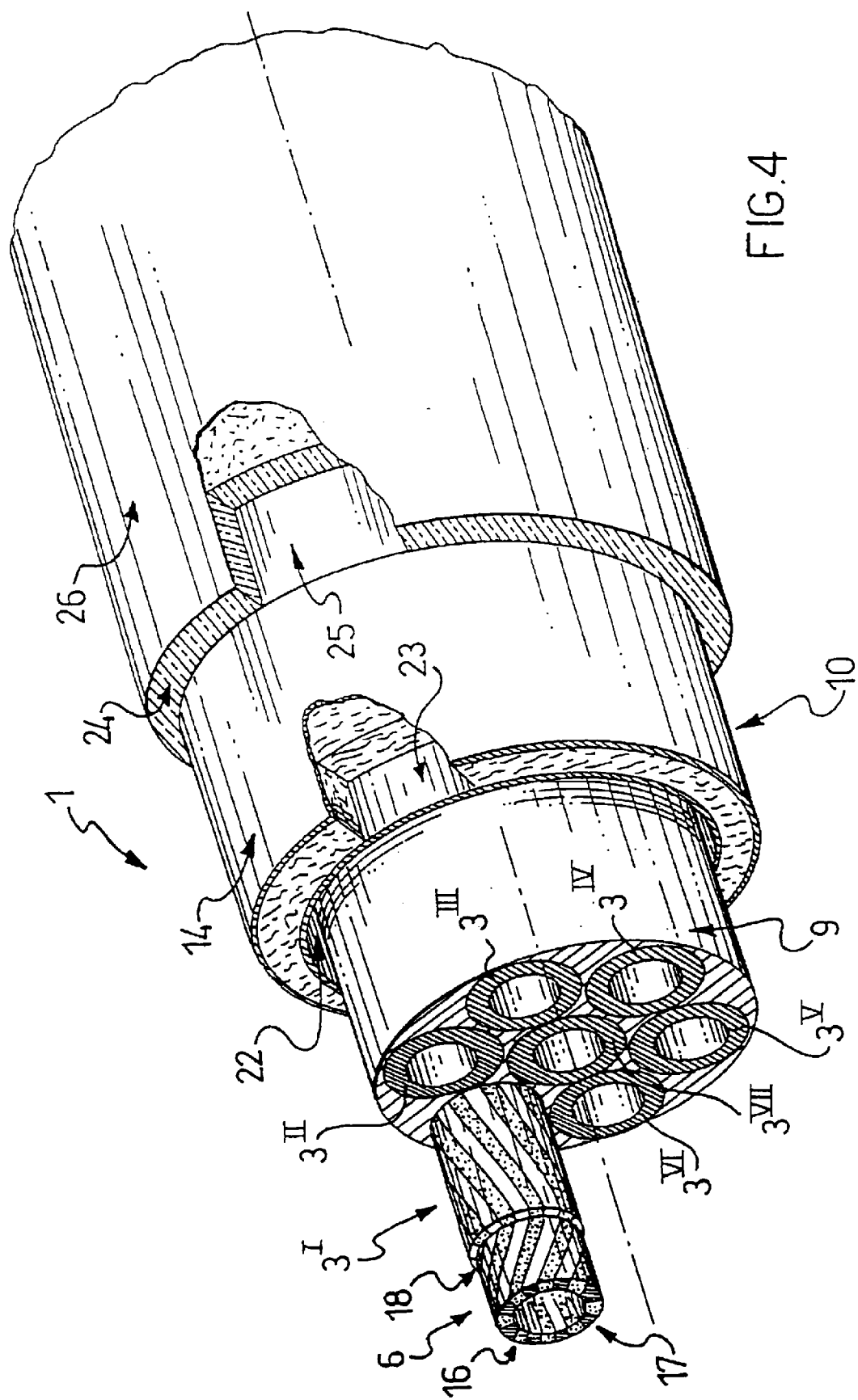
FIG. 4 shows a perspective view in an enlarged scale and in partial cross-section, of a monophase, multielement non-coaxial superconducting cable according to a further embodiment of the present invention.

In the embodiment shown in FIG. 4, that illustrates a non-coaxial and monophase superconducting cable 1, instead, the conductive elements 3I, 3II, . . . , 3VII, only comprise the phase conductor 4 which, in this case, includes superconducting tapes 18 spirally wound on the composite supporting tubular element 6.

If necessary, the cryostat 10 may comprise a hollow space 22 in which liquid nitrogen circulates, defined between the tubular shell 9 and a supporting tubular element 23.

Externally to this non-coaxial monophase superconducting cable 1 a layer of dielectric material 24 is provided for the electrical insulation of the superconducting cable, incorporated within two tubular elements 25, 26 or semiconducting material.

With reference to what has been described hereinabove, some examples will be provided hereunder which illustrate the behavior in short circuit conditions as well as the mechanical stresses of some embodiments of the superconducting cables.

EXAMPLES 1–2

Invention

According to the invention, two prototypes of high power coaxial cable were made, comprising 3 conductive elements, each including a pair of phase and return conductors consisting of tapes of superconducting material spirally wound on a respective supporting element, in this case consisting of a composite tubular element for the phase conductor and of the layer of dielectric material for the return conductor.

In particular, the composite supporting tubular element was made with annular sectors made of copper (first metallic material) and polytetrafluoroethylene, as polymeric material, alternately arranged one after the other.

In the case of Example 1, both the superconducting tapes of the phase conductor (coupled to the composite support) and the superconducting tapes of the return conductor (coupled to the stabilizing metal consisting of copper straps), were provided with a reinforcing foil made of metal, coupled to the metallic coating of the tapes themselves, whereas in the case of Example 2, they were not provided with such a reinforcing foil.

The coupling step of the reinforcing foil to the superconducting tapes was carried out by submitting, in a first step, the reinforcing foil to a tensile stress in a substantially longitudinal direction and coupling the same, in a second step, to the tapes in order to obtain a prestress of the superconducting material. In particular, the foil was submitted to a tensile stress of about $15.4*10^7$ Pa ($15.7$ kg/mm$^2$) thus obtaining a prestress degree of the superconducting material equal to about 0.1%.

In the cable of Example 1, the reinforcing foil of the phase conductor and the metallic material of the composite tubular element were electrically connected in a way known per se to the tapes of superconducting material.

The working characteristics taken into consideration for the manufacture of the cables were the following:

| | |
|---|---|
| power | 0.7 GVA |
| nominal voltage (phase-phase) | 132 kV |
| nominal current | 3070 A |
| critical current | 9210 A |
| length | 50 km |

The cables were designed in such a way as to be stable at the following short circuit conditions:

| | |
|---|---|
| short circuit current Icc | 50 kA |
| short circuit duration Δtcc | 0.5 s | further assuming:
1) that the power dissipated during the short circuit transient is wholly converted into a temperature increase of the layer of superconducting material, of the metallic coating that incorporates the superconducting material and of the metal in any way in electrical contact therewith (supporting tubular element, metallic reinforcing foil and copper straps), 2) that the dissipation is resistive with passage of all the short circuit current through the metallic material in electrical connection with the superconducting material, 3) to limit the maximum temperature reached by the superconducting at the end of the short circuit well below the maximum allowable temperature Tamm, defined as the minimum temperature between the critical temperature of the superconducting and the boiling temperature of the cooling fluid, at the minimum working pressure, assuming that the temperature increase ΔT due to the short circuit is given by the following relation:

$$\Delta Tamm \leq (Tamm - Tworking\ max)/f$$

wherein Tworking–max is the maximum working temperature and f is the safety coefficient.

A cable made with the aforesaid working characteristics has the following working temperature and pressure ranges for the liquid nitrogen:

| | |
|---|---|
| minimum working temperature = | 63.2 K |
| maximum working temperature = | 82 K |
| maximum working pressure = | 20 bar |
| minimum working pressure = | 10 bar |

Assuming that a BSCCO type high temperature superconducting material is used, having a critical temperature of about 110 K, and since the boiling temperature of the liquid nitrogen at 10 bar pressure is equal to 104 K, the maximum allowable temperature Tamm will coincide with this value.

The determination of the amount of metallic material for ensuring the cryostability of the cable in short circuit conditions was carried out according to the following equation:

$$\Delta Tamm = [(\Sigma Ri Icci^2)/(\Sigma micpi)] * \Delta tcc \quad (I)$$

wherein:

ΔTamm represents the allowable temperature increase due to short circuit,

Ri represents the resistance of the i-th element of the superconducting cable,

Icci represents the short circuit current of the i-th element of the superconducting cable, mi represents the mass of the i-th element of the superconducting cable, cpi represents the specific heat of the i-th element of the superconducting cable, Δtcc represents the duration of the short circuit.

It results:

$$mi = \delta i * Vi = \delta i * Si * li \quad (II)$$

wherein:

δi represents the density of the i-th element,

Vi represents the volume of the i-th element,

Si represents the cross section of the i-th element, li represents the length of the i-th element.

It also results:

$$Ri = \rho i * (li/Si) \quad (III)$$

wherein ρi represents the specific electric resistivity of the i-th element.

Since the value of ΔTamm, δi, li, ρi, Icci, cpi, Δtcc, as well as the cross sections of the superconducting tapes, or the metallic reinforcing foils and of the copper straps are known design data, by substituting the equation (II) and (III) in (I) it is possible to determine of the cross section of the metallic material of the supporting tubular element.

The structural characteristics of the two cable prototypes are reported in following Table I, particularly only with respect to the phase conductor. In a quite similar way, the structural characteristics of the return conductor may be determined, in view of the fact that the same short circuit current passes through both of them.

The sizes of the single sector were essentially chosen in order to comply with installation and cooling constraints; in particular, sectors having an inner diameter equal to 38.7 mm and an outer diameter equal to 48.5 mm were chosen, for which a number of sectors equal to 14 has been found to be appropriate.

The prototypes were then submitted to a number of tests that allowed to evaluate the deformations generated in the superconducting material, the traction force applied by the cable to the terminals as a reaction to the constrained shrinkage.

The results of such tests are reported in the following Table II, wherein the value of the critical deformation is also reported, that is the value of deformation above which a decrease of the current transport capacity of the superconducting material, (probably due to fractures and grain separation of the superconducting material) was detected.

In the aforesaid Table II the amount of conducting material used with respect to that required to ensure the full and adiabatic stability of the cable according to the criterion of the invention is also reported.

EXAMPLE 3

Comparison

With the purpose of making a comparison, a cable was made comprising of a plurality of conductive elements, each including a pair of phase and return conductors consisting of tapes of superconducting material spirally wound on a respective supporting element, in this case consisting of a tubular element entirely made of metal for the phase conductor and of the layer of dielectric material for the return conductor.

The tubular element entirely made of metal consisted of metallic sectors, in particular sectors made of copper.

According to the procedure described in the preceding Examples 1–2, the aforesaid cable was designed according to the criterion of cryostability of the invention, in such a way as to be stable in the short circuit conditions reported in the same.

The structural characteristics of the cable are reported in the following Table I.

Sectors having an inner diameter equal to 38.7 mm and an outer diameter equal to 45.7 mm were chosen. The preferred number of annular sectors for such arrangement has been found equal to 16.

In a quite similar way, the cable was submitted to the tests described in the preceding Examples 1–2, with respect to the determination of the mechanical stresses induced in the cable and of the stresses induced by the cable onto the terminals. The results of such tests are reported in same Table II.

Furthermore, the amount of metallic material used with respect to the minimum amount required for ensuring the stability in short circuit conditions for the aforesaid cable is also reported in Table II.

As to the cable geometry, it turns out that, having set the same inner diameter equal to 38.7 mm for all the cables or the three preceding examples for hydraulic reasons, the supporting element entirely made of metal of Example 3, because of construction reasons, implies the use of a copper section equal to 138% of the copper section of the composite tubular elements of Examples 1 and 2.

EXAMPLE 4

Comparison

With the purpose of making a comparison, a cable was made according to the same characteristics of preceding Example 3, except for the supporting tubular element, which was constituted by a tubular element made of polymeric material, in particular made of polytetrafluoroethylene.

The aforesaid tubular element entirely made of polymeric material, was compared with the prototypes according to the invention only in terms of mechanical stresses induced in the superconducting material and at the terminals, since the cable, being essentially devoid of metallic material adapted to transmit a significant current quantity, is not cryostable in short circuit conditions.

From the results of Table II, it is clear that in both prototypes of Examples 1 and 2 the deformations which the superconducting material is submitted to are substantially lower than the critical value, and further are also clearly lower than those detected for the prototype of Example 3, as an additional proof of the effectiveness of the composite supporting tubular element in reducing the magnitude of the stresses along a longitudinal direction imparted to the superconducting material.

With respect to the value of critical deformation, it is then immediately clear from the values of Table II that he cable provided with reinforcing foil, Examples 1, has a greater value than the cables not provided with such foil; this may be ascribed to the prestress effect of the layer of superconducting material consequent to the coupling step of the foil to the metallic coating of the tapes.

It is further possible to observe that, for the cable of Example 3 the deformation of the superconducting material has a greater value than the critical one, and this would affect the capacity of the superconducting of transmitting current in superconductivity conditions.

With respect to the prototype of Example 3, the prototypes of Example 1 and 2, furthermore, exert much lower traction forces on the terminals, and this to the advantage of the mechanical stability of the cable.

Although in terms of deformations on the conductors, of critical deformation and of traction forces on the terminals a comparison between the cable prototypes of the invention and the cable of Example 4 would induce to prefer the latter as it would ensure a greater current transmission capacity without incurring in problems related to mechanical stresses of the superconductors, from the data related to the amount of metallic material present in the supporting element and required for facing possible short circuit conditions, it may be inferred that a cable according to Example 4 is not adequate for use in conditions wherein a risk of short circuits exists (and no different protection means are provided).

TABLE I

|  |  | metallic material of the supporting tubular element | internal SC | $\Delta T$ (° C.) |
|---|---|---|---|---|
| Ex. 1 | sect.mm2 | 335 | 88.6 | 10 |
|  | Cu/SC | 3.8 |  |  |
| Ex. 2 | sect.mm2 | 335 | 88.6 | 10 |
|  | Cu/SC | 3.8 |  |  |
| Ex. 3 | sect.mm2 | 464 | 88.6 | 5.6 |
|  | Cu/SC | 5.2 |  |  |

Internal SC = layer of superconducting material of the internal conductor (phase conductor)
$\Delta T$ = temperature increase of the superconducting material.

TABLE II

|  | Ex. 1 | Ex. 2 | Ex. 3 | Ex. 4 |
|---|---|---|---|---|
| deformations on superconductors (%) | 0.18 | 0.18 | 0.31 | 0.05 |
| critical deformation (%) | 0.5 | 0.29 | 0.29 | 0.29 |
| traction forces (Kg) | 12500 | 12000 | 18600 | 5400 |
| copper amount (%) | 100 | 100 | 138 | — |

What is claimed is:

1. A superconducting cable comprising:
   a. a layer of tapes comprising superconducting material;
   b. a tubular element for supporting said layer of tapes comprising superconducting material;
   c. a cooling circuit, adapted to cool the superconducting material to a working temperature not higher than its critical temperature;
   characterized in that said tubular element is a composite and comprises a predetermined amount of a first material having a first thermal expansion coefficient and a second material having a second thermal expansion coefficient higher than that of said first material, said thermal expansion coefficients and said amounts of said first and second material being predetermined in such a way that said tubular element has an overall thermal shrinkage between room temperature and said working temperature of the cable such as to cause a deformation of said tapes comprising superconducting material lower than the critical deformation of said tapes;
   wherein the superconducting material is incorporated within a metal coating; and
   wherein the cable further comprises at least one reinforcing foil made of metallic material coupled to the metallic coating of said superconducting material, said foil being in electrical connection with the superconducting material.

2. A superconducting cable comprising:
   a. a layer of tapes comprising superconducting material;
   b. a tubular element for supporting said layer of tapes comprising superconducting material;
   c. a cooling circuit, adapted to cool the superconducting material to a working temperature not higher than its critical temperature;
   characterized in that said tubular element is a composite and comprises a predetermined amount of a first material having a first thermal expansion coefficient and a second material having a second thermal expansion coefficient higher than that of said first material, said thermal expansion coefficients and said amounts of said first and second material being predetermined in such a way that said tubular element has an overall thermal shrinkage between room temperature and said working temperature of the cable such as to cause a deformation of said tapes comprising superconducting material lower than the critical deformation of said tapes;

wherein the superconducting material is incorporated within a metal coating; and wherein the cable comprises two reinforcing foils made of metallic material coupled to opposite faces of said superconducting material.

3. A superconducting cable according to claim 1 or 2, wherein said superconducting material is essentially prestressed along a longitudinal direction.

4. A superconducting cable according to claim 3, wherein said material has a prestress degree along a longitudinal direction ($\gamma$) of between 0.05 and 0.2%.

5. A superconducting cable according to claim 1 or 2, wherein the reinforcing foil and the metallic coating of said superconducting tape each comprise a metal independently selected from the group consisting of copper, aluminum, silver, magnesium, nickel, bronze, stainless steel, beryllium, and alloys thereof.

6. A superconducting element comprising at least one layer of superconducting material supported by a tubular element, characterized in that said tubular element is a composite and comprises a predetermined amount of a first metallic material in electrical contact with the layer of superconducting material and at least one second polymeric material associated with said first material.

7. A superconducting element according to claim 6, wherein said first and second materials are formed as adjacent annular sectors.

8. A superconducting element according to claim 7, wherein said annular sectors are arranged one after the other.

9. A superconducting element according to claim 7, wherein said annular sectors are spirally wound according to a winding angle of between 5° and 50.

10. A superconducting element according to claim 6, wherein said first metallic material is a metal having a resistivity at 77 K<$5*10^{-9}$ $\Omega$m, a specific heat at 77 K>106 J/m$^3$K, and a heat conductivity at 77 K>5 W/mK.

11. A superconducting element according to claim 6, wherein said second material is a non-metallic material having thermal expansion coefficient higher than $17*10^{-6}$ °C$^{-1}$.

12. A superconducting element according to claim 11, wherein said second polymeric material is selected from the group consisting of polyamide, polytetrafluoroethylene and polyethylene.

13. A superconducting element according to claim 6, wherein the superconducting element comprises at least on superconducting tape wherein said layer of superconducting material is incorporated with a metallic coating and at least one reinforcing foil made of metallic material couple to said metallic coating.

14. A method for limiting th tensile stresses along a longitudinal direction between opposite fixin terminals of a superconducting cable of a type with clamped heads due to cooling, said cable comprising at least one layer of superconducting material, comprising:

including a composite tubular element in said superconducting cable for supporting the layer of superconducting material.

* * * * *

UNITED STATES PATENT AND TRADEMARK OFFICE
CERTIFICATE OF CORRECTION

PATENT NO. : 6,835,892 B2
DATED : December 28, 2004
INVENTOR(S) : Marco Nassi et al.

It is certified that error appears in the above-identified patent and that said Letters Patent is hereby corrected as shown below:

Column 16,
Line 3, "50." should read -- 50°. --.
Line 11, "having thermal" should read -- having a thermal --.
Line 18, "on" should read -- one --.
Line 21, "couple" should read -- coupled --.
Line 24, "th" should read -- the --.
Line 25, "fixin" should read -- fixing --.

Signed and Sealed this

Twenty-sixth Day of April, 2005

JON W. DUDAS
*Director of the United States Patent and Trademark Office*